United States Patent
Ikeda et al.

(10) Patent No.: US 9,605,361 B2
(45) Date of Patent: Mar. 28, 2017

(54) FIBER COMPRISING ALICYCLIC-STRUCTURE-CONTAINING POLYMER, AND METHOD FOR MANUFACTURING SAME

(71) Applicant: ZEON CORPORATION, Tokyo (JP)

(72) Inventors: Shintaro Ikeda, Tokyo (JP); Satoshi Yamada, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/031,931

(22) PCT Filed: Oct. 20, 2014

(86) PCT No.: PCT/JP2014/077826
§ 371 (c)(1),
(2) Date: Apr. 25, 2016

(87) PCT Pub. No.: WO2015/060242
PCT Pub. Date: Apr. 30, 2015

(65) Prior Publication Data
US 2016/0273131 A1    Sep. 22, 2016

(30) Foreign Application Priority Data

Oct. 24, 2013 (JP) .................. 2013-221233

(51) Int. Cl.
| | | |
|---|---|---|
| D01F 6/30 | (2006.01) |
| D01D 5/08 | (2006.01) |
| D01D 5/10 | (2006.01) |
| C08F 232/08 | (2006.01) |
| B29B 9/12 | (2006.01) |
| B29B 9/16 | (2006.01) |
| C08J 3/12 | (2006.01) |
| D01F 6/04 | (2006.01) |
| B29B 9/06 | (2006.01) |
| B29B 7/38 | (2006.01) |
| B29K 23/00 | (2006.01) |

(52) U.S. Cl.
CPC .................. *D01F 6/30* (2013.01); *B29B 9/12* (2013.01); *B29B 9/16* (2013.01); *C08F 232/08* (2013.01); *C08J 3/12* (2013.01); *D01D 5/08* (2013.01); *D01F 6/04* (2013.01); *B29B 7/38* (2013.01); *B29B 9/06* (2013.01); *B29K 2023/38* (2013.01)

(58) Field of Classification Search
CPC . C08G 61/08; C08F 8/04; C08F 32/04; C08F 32/08; C08F 2500/25; C08F 232/08; C08F 2500/18; D01D 5/10; D01F 6/02; D01F 6/28; D01F 6/96
USPC ..................... 526/281, 283; 264/211.22, 235
See application file for complete search history.

(56) References Cited

FOREIGN PATENT DOCUMENTS

| EP | 0 634 439 A1 | 1/1995 |
|---|---|---|
| JP | H02-191602 A | 7/1990 |
| JP | 2002-180325 A | 6/2002 |
| JP | 2005-171404 A | 6/2005 |
| JP | 2006-052333 A | 2/2006 |
| JP | 2014-117919 A | 6/2014 |
| WO | 94/17128 A1 | 8/1994 |

OTHER PUBLICATIONS

Jan. 20, 2015 International Search Report issued in International Patent Application No. PCT/JP2014/077826.
Jan. 20, 2015 Written Opinion issued in International Patent Application No. PCT/JP2014/077826.

*Primary Examiner* — Fred M Teskin
(74) *Attorney, Agent, or Firm* — Oliff PLC

(57) ABSTRACT

The invention is: a fiber produced by forming a fiber using pellets, and annealing the fiber at 150 to 220° C., the pellets being formed of a resin powder of a cycloolefin polymer, the resin powder having a loose bulk density of 0.3 to 0.6 g/cc when measured using 100 cc of the resin powder: a method for producing the fiber. The invention provides a method for producing a cycloolefin polymer fiber that exhibits good productivity and strength during spinning, and a low thermal shrinkage ratio.

1 Claim, No Drawings

FIBER COMPRISING ALICYCLIC-STRUCTURE-CONTAINING POLYMER, AND METHOD FOR MANUFACTURING SAME

TECHNICAL FIELD

The present invention relates to a fiber that is formed of an alicyclic structure-containing polymer, and a method for producing the same.

BACKGROUND ART

It is known to form (spin) a fiber using a hydrogenated norbornene-based ring-opening polymer having a melting point, or an amorphous cycloolefin having a glass transition temperature.

For example, Patent Literature 1 discloses a fiber-like formed article that is formed (spun) using a polymer having a melting point. Patent Literature 1 discloses forming a fiber at a spinning speed equal to or higher than 200 m/min (see the examples of Patent Literature 1).

Patent Literature 2 discloses a fiber and the like that are formed of a cycloolefin polymer that has a glass transition temperature of 70° C. or more and a cycloolefin content of at least 40 mol %, and exhibit excellent heat resistance, chemical stability, strength, nonwoven fabric production capability, shape followability, and shape retention capability, and methods for producing the same. Patent Literature 2 recommends winding the melt-extruded resin substantially without stretching the resin (i.e., effecting melt spinning so that the extrusion speed is equal to the winding speed).

It is known to pelletize a powder (resin powder) of a cycloolefin polymer (e.g., copolymer of ethylene and cycloolefin) using a method that melts the cycloolefin polymer using an extruder, and pelletizes the molten cycloolefin polymer using a pelletizer (see Patent Literature 3). According to this method, the resin powder (that is heated inside the cylinder) is melted due to heat applied by the cylinder, and subjected to shearing when caught in the screw. As a result, cyclohexane-insoluble microparticles are included in the resulting resin pellets, and a problem occurs when the resin pellets are used to produce an optical material.

Patent Literature 4 proposes preheating the resin in order to prevent a situation in which the resin is subjected to excessive shearing.

CITATION LIST

Patent Literature

Patent Literature 1: JP-A-2002-180325
Patent Literature 2: JP-A-2005-171404
Patent Literature 3: JP-A-2-191602
Patent Literature 4: WO94/017128

SUMMARY OF INVENTION

Technical Problem

In view of the above situation, the inventors of the invention formed a fiber using pellets obtained using a resin powder of a cycloolefin polymer, and annealed the fiber based on the disclosure of Patent Literature 1. As a result, the inventors found that breakage of the fiber may occur during spinning as the spinning speed (also referred to as "take-up speed", "winding speed", and the like) increases.

An object of the invention is to provide a fiber that can significantly reduce the occurrence of a burn mark when used to produce a formed article, and does not break even when the spinning speed is high, and a method for producing the same.

Solution to Problem

The inventors conducted extensive studies in order to solve the above problem. As a result, the inventors found that, when forming a fiber using pellets obtained using a resin powder of a cycloolefin polymer, and annealing the fiber to obtain the desired fiber, the fiber may break during spinning due to an oxidized resin (foreign substance) included in the pellets.

The inventors conducted further studies based on the above finding. As a result, the inventors found that, when a fiber is formed using pellets obtained using a resin powder of a cycloolefin polymer that has a loose bulk density of 0.3 to 0.6 g/cc when measured using 100 cc of the resin powder, it is possible to significantly reduce or suppress the occurrence of a burn mark when producing a formed article, and breakage of the fiber does not occur even when the spinning speed is high. This finding has led to the completion of the invention.

Several aspects of the invention provide the following fiber (see (1) and (2)) and method for producing a fiber (see (3)).

(1) A fiber produced by forming a fiber using pellets, and annealing the fiber at 150 to 220° C., the pellets being formed of a resin powder of a cycloolefin polymer, the resin powder having a loose bulk density of 0.3 to 0.6 glee when measured using 100 cc of the resin powder.

(2) The fiber according to (1), wherein the cycloolefin polymer is a hydrogenated cycloolefin ring-opening polymer that includes a repeating unit derived from a norbornene-based monomer and has a melting point.

(3) A method for producing a fiber including forming a fiber using pellets at a spinning speed of 700 m/min or more, and annealing the fiber at 150 to 220° C., the pellets being formed of a resin powder of a cycloolefin polymer, the resin powder having a loose bulk density of 0.3 to 0.6 glee when measured using 100 cc of the resin powder.

Advantageous Effects of Invention

The aspects of the invention thus provide a fiber that can significantly reduce the occurrence of a burn mark when used to produce a formed article, and does not break even when the spinning speed is high, and a method for producing the same.

DESCRIPTION OF EMBODIMENTS

1. Fiber

A fiber according to one embodiment of the invention is produced by forming a fiber using pellets, and annealing the fiber at 150 to 220° C., the pellets being formed of a resin powder of a cycloolefin polymer, the resin powder having a loose bulk density of 0.3 to 0.6 Wee when measured using 100 cc of the resin powder.

Cycloolefin Polymer

The cycloolefin polymer used in connection with one embodiment of the invention is a polymer that is obtained by polymerizing a monomer that includes at least a norbornene-based monomer, and has a melting point.

Examples of the cycloolefin polymer include a homopolymer of a cycloolefin, a copolymer of two or more cycloolefins, and a copolymer of a cycloolefin and a monomer (excluding a cycloolefin) that is copolymerizable with the cycloolefin, Examples of the cycloolefin include a norbornene compound, and a cycloolefin other than a norbornene compound.

The norbornene compound is not particularly limited as long as the norbornene compound is a norbornene ring structure-containing cycloolefin. Examples of the norbornene compound include bicyclo[2.2.1]hept-2-ene (trivial name: norbornene), a bicyclo[2.2.1]hept-2-ene derivative that includes a hydrocarbon substituent, a bicyclo[2.2.1]hept-2-ene derivative that includes a functional group, a norbornene derivative that includes three or more rings, a norbornene derivative that includes three or more rings and includes a hydrocarbon substituent, a norbornene derivative that includes three or more rings and includes a functional group, and the like.

Examples of the cycloolefin other than the norbornene compound include a monocyclic cycloolefin such as cyclobutene, 1-methylcyclopentene, 3-methylcyclobutene, 3,4-diisopropenylcyclobutene, cyclopentane, 3-methylcyclopentene, cyclooctene, 1-methylcyclooctene, 5-methylcyclooctene, cyclooctatetraene, 1,5-cyclooctadiene, and cyclododecene, and the like.

Examples of the monomer (excluding a cycloolefin) that is copolymerizable with the cycloolefin include ethylene; an α-olefin such as propylene; an acetylene compound such as acetylene, propyne, and 1-butyne; an aromatic vinyl compound such as styrene; a diene compound that includes a double bond at each end, such as 1,6-heptadiene; and the like.

A norbornene compound polymer having a melting point is preferable as the cycloolefin polymer used in connection with one embodiment of the invention.

Examples of the norbornene compound polymer having a melting point include a ring-opening (co)polymer of a norbornene compound having a melting point, an addition (co)polymer of a norbornene compound having a melting point, and an addition copolymer of a norbornene compound and an α-olefin having a melting point.

Among these, a ring-opening (co)polymer of a norbornene compound having a melting point is preferable, a hydrogenated ring-opening (co)polymer of a norbornene compound having a melting point is more preferable, and a hydrogenated ring-opening (co)polymer of a norbornene compound having a melting point that is obtained using at least a polycyclic norbornene-based monomer that includes three or more rings is particularly preferable, since a fine powder is easily obtained by drying the (co)polymer.

The term "polycyclic norbornene-based monomer that includes three or more rings" used herein refers to a norbornene-based monomer that includes a norbornene ring and one or more rings fused with the norbornene ring in the molecule.

Specific examples of the polycyclic norbornene-based monomer that includes three or more rings include dicyclopentadiene and a dicyclopentadiene derivative such as tricyclo[4.3.0.1$^{2,5}$]deca-3,7-diene (trivial name: dicyclopentadiene), methyldicyclopentadiene, and dimethyldicyclopentadiene; a norbornene derivative that includes an aromatic ring, such as tetracyclo[9.2.1.0$^{2,10}$.0$^{3,8}$]tetradeca-3,5,7,12-tetraene (also referred to as 1,4-methano-1,4,4a,9a-tetrahydro-9H-fluorene) and tetracyclo[10.2.1.0$^{2,11}$.0$^{4,9}$]pentadeca-4,6,8,13-tetraene (also referred to as 1,4-methano-1,4,4a,9,9a,10-hexahydroanthracene); tetracyclododecene and a tetracyclododecene derivative that is substituted with an alkyl group, such as tetracyclododecene, 8-methyltetracyclododecene, 8-ethyltetracyclododecene, 8-cyclohexyltetracyclododecene, and 8-cyclopentyltetracyclododecene; a tetracyclododecene derivative that includes a double bond that is situated outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; a tetracyclododecene derivative that includes an aromatic ring, such as 8-phenyltetracyclododecene; a tetracyclododecene derivative that includes an oxygen atom-containing substituent, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride; a tetracyclododecene derivative that includes a nitrogen atom-containing substituent, such as 8-cyanotetracyclododecene and tetracyclododecene-8,9-dicarboxylic acid imide; a tetracyclododecene derivative that includes a halogen atom-containing substituent, such as 8-chlorotetracyclododecene; a tetracyclododecene derivative that includes a silicon atom-containing substituent, such as 8-trimethoxysilyhetracyclododecene; and the like.

These norbornene-based monomers may be used either alone or in combination.

Examples of the monomer that is copolymerizable with the polycyclic norbornene-based monomer include a bicyclic norbornene-based compound that does not include a ring structure that is fused with the norbornene skeleton, a monocycloolefin, a cyclic diene, and derivatives thereof.

The hydrogenated cycloolefin ring-opening polymer having a melting point that is suitably used in connection with one embodiment of the invention is preferably obtained using at least a polycyclic norbornene-based monomer that includes three or more rings. The term "polycyclic norbornene-based monomer" used herein refers to a norbornene-based compound that includes a norbornene skeleton and one or more ring structures that are fused with the norbornene skeleton in the molecule. It is preferable to use a polycyclic norbornene-based monomer mixture that includes dicyclopentadiene in a ratio of 50 wt % or more, and more preferable to use dicyclopentadiene alone, from the viewpoint of improving the crystallinity of the hydrogenated cycloolefin ring-opening polymer, and ensuring that the resulting formed article exhibits excellent heat resistance.

The polycyclic norbornene-based monomer may be present in the form of an endo-stereoisomer or an exo-stereoisomer, and both the endo-stereoisomer and the exo-stereoisomer can be used as the monomer. Either the endo-stereoisomer or the exo-stereoisomer may be used alone, or an isomer mixture that includes the endo-stereoisomer and the exo-stereoisomer in an arbitrary ratio may be used. Note that it is preferable to increase the ratio of the endo-stereoisomer or the exo-stereoisomer from the viewpoint of improving the crystallinity of the hydrogenated cycloolefin ring-opening polymer, and obtaining a resin composition that exhibits excellent heat resistance. For example, it is preferable to set the ratio of the endo-stereoisomer or the exo-stereoisomer to 80% or more, more preferably 90% or more, and particularly preferably 95% or more. Note that it is preferable to increase the ratio of the endo-stereoisomer from the viewpoint of ease of synthesis.

The cycloolefin polymer may be produced using an arbitrary method. For example, the cycloolefin polymer may be produced using a method that subjects a norbornene-based monomer to ring-opening polymerization in the presence of a specific catalyst, and hydrogenates the resulting polymer to obtain a hydrogenated cycloolefin ring-opening polymer having a melting point (see JP-A-2006-52333), a method that polymerizes an α-olefin (e.g., ethylene) and a norbornene-based monomer in the presence of a catalyst, and optionally hydrogenates the resulting polymer to obtain an α-olefin-cycloolefin copolymer (see JP-A-2-191602), or the like.

The method disclosed in JP-A-2006-52333 produces a cycloolefin ring-opening polymer having syndiotacticity, and hydrogenates the cycloolefin ring-opening polymer to efficiently produce the desired hydrogenated cycloolefin ring-opening polymer.

The cycloolefin polymer can be collected as a solid by adding a poor solvent (normally a polar solvent such as acetone or ethanol) to the reaction mixture to effect precipitation and solid-liquid separation.

The collected cycloolefin polymer is dried using a normal method to obtain a resin powder.

The melting point of the cycloolefin polymer used in connection with one embodiment of the invention is preferably 200° C. or more, more preferably 230° C. or more, and particularly preferably 250° C. or more.

When the melting point of the cycloolefin polymer used in connection with one embodiment of the invention is within the above range, the resulting fiber exhibits excellent heat resistance.

The polystyrene-equivalent weight average molecular weight (Mw) of the cycloolefin polymer used in connection with one embodiment of the invention is preferably 10,000 to 1,000,000, more preferably 15,000 to 900,000, and particularly preferably 20,000 to 800,000. If the weight average molecular weight (Mw) of the cycloolefin polymer is too low, deterioration in mechanical strength may occur. If the weight average molecular weight (Mw) of the cycloolefin polymer is too high, it may be difficult to form a fiber due to an increase in solution viscosity.

The molecular weight distribution (Mw/Mn) of the cycloolefin polymer used in connection with one embodiment of the invention is preferably 5 or less, and more preferably 4 or less. When the molecular weight distribution of the cycloolefin polymer is within the above range, it is possible to further improve mechanical strength.

Various additives may be added to the cycloolefin polymer taking account of the application and the storage environment.

The additives are not particularly limited as long as the additives are generally used for a thermoplastic resin material. Examples of the additives include an antioxidant, a UV absorber, a light stabilizer, a near-infrared absorber, a coloring agent (e.g., dye and pigment), a plasticizer, an antistatic agent, a fluorescent whitening agent, an additional resin, and the like.

Examples of the antioxidant include a phosphorus-based antioxidant, a phenol-based antioxidant, a sulfur-based antioxidant, and the like.

Examples of the phosphorus-based antioxidant include a monophosphite-based compound such as triphenyl phosphite, diphenyl isodecyl phosphite, phenyl diisodecyl phosphite, tris(nonylphenyl) phosphite, tris(dinonylphenyl) phosphite, tris(2,4-di-t-butylphenyl) phosphite, and 10-(3,5-di-t-butyl-4-hydroxybenzyl)-9,10-dihydro-9-oxa-10-phosphaphenanthrene 10-oxide, a diphosphite-based compound such as 4,4'-butylidenebis(3-methyl-6-t-butylphenylditridecyl) phosphite and a 4,4'-isopropylidenebis(phenyldialkyl ($C_{12}$-$C_{15}$)) phosphite, 6-[3-(3-t-butyl-4-hydroxy-5-methylphenyl)propoxy]-2,4,8,10-tetrakis-t-butyldibenzo[d,f][1.3.2]dioxaphosphepine, 6-[3-(3,5-di-t-butyl-4-hydroxyphenyl)propoxy]-2,4,8,10-tetrakis-t-butyldibenzo[d,f][1.3.2]dioxaphosphepine, and the like.

Examples of the phenol-based antioxidant include pentaerythrityl-tetrakis[3-(3,5-di-t-butyl-4-hydroxyphenyl) propionate], 2,2-thiodiethylenebis[3-(3,5-di-t-butyl-4-hydroxyphenyl) propionate], octadecyl-3-(3,5-di-t-butyl-4-hydroxyphenyl) propionate, 3,9-bis{2-[3-(3-t-butyl-4-hydroxy-5-methylphenyl)[propionyloxy]]-1,1-dimethylethyl}-2,4,8,10-tetraoxaspiro[5,5]undecane, 1,3,5-trimethyl-2,4,6-tris(3,5-di-t-butyl-4-hydroxybenzyl) benzene, and the like.

Examples of the sulfur-based antioxidant include dilauryl 3,3'-thiodipropionate, dimyristyl 3,3'-thiodipropionate, distearyl 3,3'-thiodipropionate, laurylstearyl 3,3'-thiodipropionate, pentaerythritoltetrakis(β-lauryl thiopropionate), 3,9-bis(2-dodecylthioethyl)-2,4,8,10-tetraoxaspiro[5,5]undecane, and the like.

These antioxidants may be used either alone or in combination.

The antioxidant is normally used in a ratio of 0.05 to 2 parts by weight, preferably 0.05 to 1.5 parts by weight, and more preferably 0.1 to 1 part by weight, based on 100 parts by weight of the cycloolefin polymer. If the antioxidant is used in a ratio of less than 0.05 parts by weight, the resin composition may exhibit insufficient thermal stability. If the antioxidant is used in a ratio of more than 2 parts by weight, the hue and the light transmittance of the formed article formed of the resin composition may deteriorate.

The cycloolefin polymer thus obtained is normally characterized in that the polymer powder (resin powder) has a loose bulk density of less than 0.3 g/cc when measured using 100 cc of the polymer powder. In such a case, the cycloolefin polymer is compression-formed at a temperature lower than the melting temperature of the cycloolefin polymer optionally after adding various additives to the cycloolefin polymer so that the resin powder of the cycloolefin polymer has a loose bulk density of 0.3 to 0.6 g/cc when measured using 100 cc of the resin powder.

Note that the melting temperature of the cycloolefin polymer refers to the glass transition temperature and/or the melting point of the cycloolefin polymer. When the cycloolefin polymer has a plurality of glass transition temperatures and/or melting points, the melting temperature of the cycloolefin polymer refers to the highest temperature among the plurality of glass transition temperatures and/or melting points. It is possible to prevent the fusion of the resin by forming the cycloolefin polymer at a temperature lower than the melting temperature.

A compression machine that is used in the chemical industry may suitably be used as a compression forming machine that is used for compression forming. A tableting machine or the like may be used as the compression forming machine.

Examples of the compression machine include a batch-type compression machine such as a press compression machine that subjects a powder to press compression to form a plate-like formed article; an extrusion compression machine that includes a die and a screen, and extrudes a powder using a screw to form a strand-like formed article (which is normally cut to have an arbitrary size); a continuous compression machine such as a roll compression machine that forces a resin powder into the space between rolls that rotate relative to each other, and forms the resin powder between the rolls using the pressure applied by the rolls to form a strip-like formed article; and the like.

Among these, the continuous compression machine is preferable from the viewpoint of productivity, and the roll compression machine is particularly preferable since a high pressure can be applied in view of the structure of the machine, and a powder (agglomerate powder) having a higher loose bulk density can be obtained.

The resin powder of the cycloolefin polymer having a loose bulk density of 0.3 to 0.6 glee can be obtained by thus compression-forming the cycloolefin polymer (to which various additives are optionally added) having a loose bulk density of less than 0.3 g/cc.

The loose bulk density is adjusted to 0.3 to 0.6 g/cc during compression forming by adjusting the pressure applied to the resin powder introduced into the compression forming machine. It is preferable to compression-form the cycloolefin polymer at a temperature lower than the melting temperature of the resin by 10° C. or more.

It is preferable that the content of a component having a sieve particle size of 0.05 mm or less in the resin powder of the cycloolefin polymer used in connection with one embodiment of the invention that has a loose bulk density of 0.3 to 0.6 g/cc be 1 wt % or less in order to efficiently fill a hot melt forming machine with the powder. The content of a component having a sieve particle size of 0.05 mm or less can be adjusted to 1 wt % or less by sieving the resin powder. The resin powder can be sieved using a classifier. For example, a pneumatic classifier or a vibration classifier may be used.

When the resin powder of the cycloolefin polymer has too large a sieve particle size, it may be difficult to fill the forming machine with the resin powder depending on the size of the forming machine. In such a case, it is preferable to perform a disintegration step that disintegrates the powder having too large a sieve particle size to have an appropriate size.

The disintegration step may be performed using a disintegrator. For example, a known disintegrator such as a cutter mill, a hammer mill, a twin-screw disintegrator, a pin mill crusher, or a rotary blade disintegrator may be used.

Pelletization

The polymer powder of the cycloolefin polymer thus obtained that has a loose bulk density of 0.3 to 0.6 g/cc is subjected to melt forming using a hot melt forming machine.

Examples of the hot melt forming method include a known method that forms a material in a molten state, such as injection forming, sheet forming, blow forming, injection blow forming, inflation forming, T-die forming, press forming, and extrusion forming. A secondary forming method such as pressure forming or vacuum forming may also be used. It is also possible to use a method that kneads a specific material using a kneader (e.g., heat roll, kneader, Banbury mixer, or extruder), cools and crushes the kneaded material, and forms the material by transfer forming, injection forming, compression forming, or the like.

A T-die forming process normally passes a resin that has been melted and kneaded using an extruder or the like through a T-die that is connected to the extruder or the like to form a film-like formed article.

A strand-like formed article obtained using a twin-screw extruder is cooled with water or the like, and cut to have a given size using a pelletizer to obtain pellet-like formed articles.

Spinning

The resulting pellet-like formed articles are subjected to spinning to form a fiber (i.e., a fiber is formed using the pellet-like formed articles), which is annealed at 150 to 220° C. A normal spinning method such as a melt spinning method, a dry spinning method, or a wet spinning method may be used. It is preferable to use a melt spinning method.

The melt spinning method is not particularly limited. A normal melt spinning method that utilizes an extruder may be used.

Specifically, the pellets are thermally melted using the cylinder of the extruder, and the cycloolefin resin that has been melted and weighed is guided to the die. The resin is extruded from the spinning nozzle (spinneret) to obtain a fiber. The fiber discharged from the nozzle is taken up using a roller or the like while cooling the fiber with cold air or the like.

The fiber that has been taken up is subjected to the annealing step either after being wound or directly.

The melting temperature (cylinder temperature) of the pellets is set taking account of the melting point or the glass transition temperature of the cycloolefin resin that forms the pellets. When the cycloolefin resin has a melting point, the melting temperature of the pellets is set to be higher than the melting point by 10 to 80° C. (preferably 15 to 50° C.). When the cycloolefin resin has a glass transition temperature (Tg), the melting temperature of the pellets is set to be higher than the glass transition temperature (Tg) by 60 to 180° C. (preferably 80 to 150° C.). The die temperature and the nozzle temperature are arbitrarily set so that productivity is not impaired.

The resin extrusion speed is normally set to be equal to or lower than the take-up speed. If the extrusion speed is too low, the fiber may become too thin and easily break. If the extrusion speed is too high, it may be difficult to wind the fiber. Therefore, it is preferable to arbitrarily set the extrusion speed taking account of the nozzle diameter, the take-up speed, and the desired fiber diameter.

The take-up speed is not particularly limited. The take-up speed is preferably 700 m/min or more, and more preferably 700 to 1,500 m/min, when applied to the fiber according to one embodiment of the invention.

An additional resin may be extruded at the same time as the cycloolefin resin to form a multi-layer composite fiber (e.g., a fiber having a sheath-core structure or a side-by-side structure). Examples of the additional resin include a polyamide, a polyester, polyethylene, polypropylene, an acrylic resin, and the like.

The stretching ratio is set taking account of the desired strength and diameter of the fiber. The stretching ratio is normally set to a range from about 150% to about 800%.

The stretching temperature is set taking account of the glass transition temperature (Tg) of the cycloolefin resin that forms the pellets. The stretching temperature is normally set to be higher than the glass transition temperature (Tg) by 5 to 100° C. (preferably 5 to 50° C.).

Annealing

The annealing step may be performed in a state in which the fiber has been wound, or may be performed in a state in which the fiber extends linearly. The fiber may be stretched during the annealing step, or may be stretched after the annealing step. The fiber may not be stretched during and after the annealing step to obtain an unstretched fiber.

The annealing temperature is set to 150 to 220° C., and preferably 160 to 200° C.

The annealing time is set to 30 seconds to 60 minutes, and preferably 1 to 30 minutes.

It is possible to suppress or reduce the thermal shrinkage of the (stretched) fiber, and improve the strength of the fiber by annealing the fiber.

Since the fiber according to one embodiment of the invention also exhibits excellent transparency, the fiber according to one embodiment of the invention can also be used as an optical fiber and the like. Since the fiber according to one embodiment of the invention exhibits excellent heat resistance, chemical stability, strength, and workability, the fiber according to one embodiment of the invention can be used to produce a twisted yarn, a woven fabric, a nonwoven fabric, and the like, and applied to a net, a rope, a fence, a tire cord, and the like. A woven fabric and a nonwoven fabric produced using the fiber according to one embodiment of the invention can be used for clothes applications such as clothes members (interlining, adhesive interlining, cotton wad, brassiere pad, shoulder pad, and jumper liner), disposable clothes (stuff jumper and travel underwear), shoes (inner sole material, arctic boots, and baby shoes), shoe members (insole and fishing boot sole), badges, gloves, slippers, and hats, protective applications such as protective clothes (work wear, experimental wear, and dustproof wear), and protective articles (safety shoes, working gloves, smoke-proof mask, dust mask, and hazard mask), medical applications (surgical suit, drape, birthing pad, cap, mask, sheet, anti-bacterial mat, cataplasm ground fabric, poultice ground fabric, plaster cast material, leukocyte separation material, and artificial skin), building applications (roofing, roofing base, tufted carpet ground fabric, dew condensation prevention sheet, wall material, soundproof material, vibration insulator, wood plate, cure sheet, and coating base), construction applications (drain material, filtering material, soil suck-out prevention material, separation material, seepage control sheet, reinforcing material, protective material, asphalt overlay, underground pipe repair material, and anti-corrosion material), vehicle applications such as automotive interior materials (floor mat, door trim, trunk mat, ceiling material, boot, liner, headrest, bonnet cover, sound-absorbing material, and vibration-proof material), and automotive parts (air cleaner, oil filter, clean filter, and air intake filter), hygiene applications such as diapers (disposable diaper and diaper cover), sanitary articles (napkin and tampon), first-aid outfits (gauze, first-aid adhesive tape, and cotton swab), cleaning articles (wet tissue, make-up cotton, and nursing pad), wet towels, and masks, furniture and interior applications such as carpets (carpet, carpet ground fabric, tile carpet, electric carpet, mat ground fabric, and undercarpet), furniture members (cushion material and chair cotton wad), fittings (shoji paper, tatami mat, and window shade), wallpapers, and ornaments (pennant, shade, and artificial flower), wiper and filter applications such as wipers, wet wipers, oil strainers, copier cleaning materials, air filters (pre-filter, medium-high performance filter, and super-high performance filter), bag filters, liquid filters, electret filters, cleaning filters, filter presses, waste water treatment mats, salt removal filters, and gas absorption filters, night clothes applications such as bedding (bedding cotton wad and bedding bag), pillowcases, sheets, and blankets, agriculture and gardening applications (greenhouse sheet, plant bed sheet, floating row cover, frost prevention sheet, shading sheet, weed barrier sheet, and gardening planter), leather applications (artificial leather ground fabric, synthetic leather ground fabric, and vinyl leather ground fabric), daily goods applications such as storage articles (storage bag, suit cover, and insecticide cover), packaging materials (cloth wrapper and packing), cleaning supplies (chemical dustcloth and scrubbing brush), bags (chemical heating pad, freshness-keeping desiccant bag, and shopping bag), food packagings (tea bag, coffee bag, food bag, and container), everyday goods (calendar, anti-slip sheet, eye mask, book jacket, deodorization sheet, and aroma agent ground fabric), kitchen articles (drainer sheet, cooking paper, scrubbing brush, roll towel, and gas extinction cloth), tableware (tablecloth, luncheon mat, and coaster), office supplies (stamp pad, felt-tip pen wick, message board material, blackboard eraser, and envelope), sporting goods (golf club head cover and tennis racket grip), handicraft articles, and iron mats, industrial material applications such as industrial materials (polishing agent, oil-absorbing material, paper making felt, heat-resistant cushion, concrete formwork drain material, drainer material, heat-resistant material, soundproof material, and vibration insulator), electrical materials (printed circuit board, electrical insulation material, electromagnetic shielding material, and electric wire tape), batteries (battery separator), product materials (FRP base, tape, printing ground fabric, synthetic paper, electrographic recording medium, adhesive tape, thermal transfer sheet, and radiation shielding mat), OA equipment (flexible disk liner, flexible disk packaging material, and ink-retaining material for ink cartridge), AV equipment (speaker diaphragm and sound-absorbing material), rolls (puff roll, squeezing roll, and oiling roll), machine members (V-belt, conveyer belt, and timing belt), musical instruments (piano key cushion and hammer rail), packaging materials (dry ice packaging material and packing), absorbents, moisture retention materials, liquid-retaining materials, water filter materials, hose reinforcing materials, tire reinforcing materials, and yacht sails, and the like.

EXAMPLES

The invention is further described below by way of examples and comparative examples. Note that the invention is not limited to the following examples.

The units "parts" and "%" used in connection with the examples and the comparative examples respectively refer to "parts by weight" and "wt %" unless otherwise indicated.

The properties were measured as described below.

(1) Molecular Weight (Weight Average Molecular Weight and Number Average Molecular Weight) of Cycloolefin Ring-Opening Polymer The molecular weight (weight average molecular weight and number average molecular weight) of the cycloolefin ring-opening polymer was determined as a polystyrene-equivalent value using a gel permeation chromatography (GPC) system ("HLC-8220" manufactured by Tosoh Corporation) and an H-type column (manufactured by Tosoh Corporation) (solvent: tetrahydrofuran, measurement temperature: 40° C.).

(2) Hydrogenation Rate of Hydrogenated Cycloolefin Ring-Opening Polymer

The hydrogenation rate of the hydrogenated cycloolefin ring-opening polymer was determined by $^1$H-NMR measurement.

(3) Melting Point of Hydrogenated Cycloolefin Ring-Opening Polymer

The melting point of the hydrogenated cycloolefin ring-opening polymer was measured using a differential scanning calorimeter (DSC) at a heating rate of 10° C./min.

(4) Ratio of Racemo Diads in Hydrogenated Cycloolefin Ring-Opening Polymer

The ratio of racemo diads in the hydrogenated cycloolefin ring-opening polymer was determined by subjecting the hydrogenated cycloolefin ring-opening polymer to $^{13}$C-NMR measurement at 200° C. using o-dichlorobenzene-$d_4$ as a solvent, and calculating the ratio of racemo diads based on the intensity ratio of the signal at 43.35 ppm (attributed to meso diads) to the signal at 43.43 ppm (attributed to racemo diads).

(5) Loose Bulk Density

The sample was allowed to fall into the 100 cc bulk density measurement cup of a powder property analyzer ("Powder Tester TP-X" manufactured by Hosokawa Micron Corporation), and the weight of the sample when 100 cc of the sample was introduced into the cup was measured to calculate the loose bulk density (g/cc).

(6) Productivity of Fiber

The fiber productivity was evaluated based on the occurrence of breakage during spinning. A spinning process that produces a fiber having a length of 1,000 m was performed ten times. A case where the number of times in which breakage occurred until a fiber having a length of 800 m was obtained was 1 or less was evaluated as "Good", a case where the number of times in which breakage occurred until a fiber having a length of 800 m was obtained was 2 to 4 was evaluated as "Fair", and a case where the number of times in which breakage occurred until a fiber having a length of 800 m was obtained was 5 or more was evaluated as "Bad".

(7) Bending Test (Bendability of Fiber)

The bendability of the fiber was evaluated based on the occurrence of breakage when the fiber was repeatedly bent by 180°. A case where eight or more fibers among ten fibers did not break when bent 50 times or more was evaluated as "Good", a case where eight or more fibers among ten fibers broke when bent 30 times or more and less than 50 times was evaluated as "Fair", and a case where eight or more fibers among ten fibers broke when bent less than 30 times was evaluated as "Bad".

(8) Shrinkage Ratio of Fiber

Ten fibers that were cut to have a length of 10 cm were suspended in an oven (internal temperature: 150° C.), and allowed to stand for 30 minutes. The length of each fiber was then measured, and the average value thereof was calculated to determine the shrinkage ratio.

Synthesis Example 1

A metal autoclave (which had been sufficiently dried and in which the internal atmosphere had been replaced by nitrogen) was charged with 154.5 parts of cyclohexane, 42.8 parts of a 70% cyclohexane solution of dicyclopentadiene (endo-stereoisomer content: 99% or more) (amount of dicyclopentadiene: 30 parts), and 1.8 parts of 1-hexene, and the mixture was heated to 53° C.

Separately, 0.060 parts of an n-hexane solution of diethylaluminum ethoxide (19 wt %) was added to a solution prepared by dissolving 0.015 parts of tetrachlorotungsten phenylimide(tetrahydrofuran) complex in 0.70 parts of toluene, and the mixture was stirred for 10 minutes to prepare a catalyst solution. The catalyst solution was added to the autoclave to initiate a ring-opening polymerization reaction. The mixture was reacted at 52° C. for 4 hours to obtain a solution of a dicyclopentadiene ring-opening polymer.

The number average molecular weight (Mn) and the weight average molecular weight (Mw) of the resulting dicyclopentadiene ring-opening polymer were respectively 9,100 and 29,000, and the molecular weight distribution (Mw/Mn) calculated from the number average molecular weight (Mn) and the weight average molecular weight (Mw) was 3.19.

After the addition of 0.038 parts of 1,2-ethanediol (terminator) to 200 parts of the solution of the dicyclopentadiene ring-opening polymer, the mixture was heated to 60° C., and stirred for 1 hour to terminate the polymerization reaction. After the addition of 1 part of a hydrotalcite-like compound ("Kyowaad (registered trademark) 2000" manufactured by Kyowa Chemical Industry Co., Ltd.), the mixture was heated to 60° C., and stirred for 1 hour. After the addition of 0.4 parts of Radiolite (registered trademark) #1500 (manufactured by Showa Chemical Industry Co., Ltd.) (filter aid), the adsorbent was filtered off using a PP pleated cartridge filter ("TCP-HX" manufactured by Advantec Toyo Kaisha, Ltd.).

100 parts of cyclohexane was added to 200 parts of the solution of the dicyclopentadiene ring-opening polymer (amount of polymer: 30 parts). After the addition of 0.0042 parts of chlorohydridocarbonyltris(triphenylphosphine)ruthenium, a hydrogenation reaction was effected at 180° C. for 5 hours under a hydrogen pressure of 6 MPa.

The resulting solution was a slurry solution in which the polymer precipitated. The hydrogenated polymer was separated from the solution using a centrifuge, and dried at 60° C. for 24 hours under reduced pressure to obtain 29 parts of a hydrogenated dicyclopentadiene ring-opening polymer having crystallinity. The loose bulk density, the hydrogenation rate, the ratio of racemo diads, and the melting point were measured, and found to be 0.41, 99% or more, 89%, and 263° C., respectively.

Synthesis Example 2

A hydrogenated ring-opening polymer powder was obtained in the same manner as in Synthesis Example 1, except that 0.053 parts of chlorohydridocarbonyltris(triphenylphosphine)ruthenium was used as the hydrogenation catalyst, and the hydrogenation reaction was effected at 155° C. The yield of the hydrogenated polymer powder was 30 parts. The loose bulk density, the hydrogenation rate, the ratio of racemo diads, and the melting point were measured, and found to be 0.20, 99% or more, 89%, and 263° C., respectively.

Synthesis Example 3

Compression Forming 0.5 parts of a powdery antioxidant (tetrakis[methylene-3-(3',5'-di-tert-butyl-4'-hydroxyphenyl) propionate]methane, "Irganox (registered trademark) 1010" manufactured by BASF Japan Ltd.) was mixed with 100 parts of the hydrogenated crystalline cycloolefin ring-opening polymer powder obtained in Synthesis Example 2, and the mixture was compression-formed using a compression forming machine ("Briquetter BGS-IV" manufactured by Sintokogio, Ltd., provided with a vacuum deaeration mechanism) to obtain a strip-like compression-formed article.

The compression forming conditions were as follows.
Roll pocket shape: wavy roll (R=3)
Roll rotational speed: 20 rpm
Roll pressure: 15 kN The strip-like compression-formed article was disintegrated using a disintegrator ("Flake Crusher FC-200" manufactured by Hosokawa Micron Corporation, provided with a mesh screen having an inner diameter of 5 mm) to obtain a flaky powder. The particle size of the powder was measured through classification using a sieve. It was found that the content of a powder having a particle size of 10 mm or more was 0%, the content of a powder having a particle size of 0.1 mm or less was 0.7%, and the loose bulk density was 0.32 g/cc.

Synthesis Example 4

A flaky powder was obtained in the same manner as in Synthesis Example 3, except that the compression forming conditions were changed as follows.
Roll rotational speed: 7.3 rpm
Roll pressure: 70 kN The particle size of the flaky powder was measured through classification using a sieve. It was found that the content of a powder having a particle size of 10 mm or more was 0%, the content of a powder having a particle size of 0.1 mm or less was 0.6%, and the loose bulk density was 0.47 g/cc.

Example 1

Production of Pellet-Like Formed Articles

The powder obtained in Synthesis Example 1 was introduced into a twin-screw extruder ("TEM-37B" manufactured by Toshiba Machine Co., Ltd., provided with four die holes having an inner diameter of 3 mm), and subjected to hot melt extrusion forming to obtain a strand-like formed article. The strand-like formed article was cut using a strand cutter so as to have a cylindrical pellet-like shape having a diameter of 3 mm and a length of 3 mm to obtain pellet-like hot melt extrusion formed articles.

The twin-screw extruder was operated under the following conditions.
Barrel temperature: 270 to 280° C.
Die temperature: 250° C.
Screw rotational speed: 145 rpm
Feeder rotational speed: 50 rpm

Production of Fiber

The resulting pellets were melt-extruded using a circular nozzle (spinning temperature: 290° C.), wound at a winding speed of 800 m/min, and annealed at 200° C. for 10 minutes to obtain a fiber. The productivity, the bendability, and the shrinkage ratio of the resulting fiber were measured. The results are shown in Table 1.

Example 2

A fiber was produced in the same manner as in Example 1, except that the powder obtained in Synthesis Example 3 was used, the winding speed was set to 1,000 m/min, and the annealing temperature was set to 180° C. The productivity, the bendability, and the shrinkage ratio of the resulting fiber were measured. The results are shown in Table 1.

Example 3

A fiber was produced in the same manner as in Example 1, except that the powder obtained in Synthesis Example 4 was used, and the annealing temperature was set to 160° C. The productivity, the bendability, and the shrinkage ratio of the resulting fiber were measured. The results are shown in Table 1.

Comparative Example 1

A fiber was produced in the same manner as in Example 1, except that the powder obtained in Synthesis Example 2 was used, the winding speed was set to 700 m/min, and the annealing temperature was set to 160° C. The productivity, the bendability, and the shrinkage ratio of the resulting fiber were measured. The results are shown in Table 1.

Comparative Example 2

A fiber was produced in the same manner as in Example 1, except that the powder obtained in Synthesis Example 1 was used, and the annealing temperature was set to 120° C. The productivity, the bendability, and the shrinkage ratio of the resulting fiber were measured. The results are shown in Table 1.

Comparative Example 3

A fiber was produced in the same manner as in Example 1, except that the powder obtained in Synthesis Example 2 was used, the winding speed was set to 200 m/min, and the annealing temperature was set to 160° C. The productivity, the bendability, and the shrinkage ratio of the resulting fiber were measured. The results are shown in Table 1.

Comparative Example 4

A fiber was produced in the same manner as in Example 1, except that the powder obtained in Synthesis Example 1 was used, and the annealing temperature was set to 230° C. The productivity, the bendability, and the shrinkage ratio of the resulting fiber were measured. The results are shown in Table 1.

TABLE 1

|  |  | Example | | | Comparative Example | | | |
| --- | --- | --- | --- | --- | --- | --- | --- | --- |
|  |  | 1 | 2 | 3 | 1 | 2 | 3 | 4 |
| Pelletization | Bulk density (g/cc) | 0.4 | 0.3 | 0.5 | 0.2 | 0.4 | 0.2 | 0.4 |
| Production of fiber | Spinning speed (m/min) | 800 | 1000 | 800 | 700 | 800 | 200 | 800 |
|  | Productivity | Good | Good | Good | Bad | Good | Fair | Good |
|  | Annealing temperature (° C.) | 200 | 180 | 160 | 160 | 120 | 160 | 230 |
| Properties of fiber | Bending test (bendability) | Good | Good | Good | Bad | Good | Fair | Bad |
|  | Shrinkage ratio (%) | 6 | 7 | 7 | 8 | 27 | 7 | 6 |

As is clear from the results obtained in Examples 1 to 3 and Comparative Examples 1 to 4, the productivity and the bendability of the fiber were low when the loose bulk density was low (Comparative Examples 1 and 3). When the annealing temperature was outside the range according to the invention, the resulting fiber exhibited inferior properties (e.g., high shrinkage ratio or low bendability) even when the loose bulk density was within the range according to the invention.

The invention claimed is:

1. A method for producing a fiber comprising forming a fiber using pellets at a spinning speed of 700 m/min or more, and annealing the fiber at 150 to 220° C., the pellets being formed of a resin powder of a cycloolefin polymer, the resin powder having a loose bulk density of 0.3 to 0.6 g/cc when measured using 100 cc of the resin powder.

* * * * *